(No Model.)
O. H. SAXTON.
PORTABLE TELEPHONE.
No. 317,213. Patented May 5, 1885.
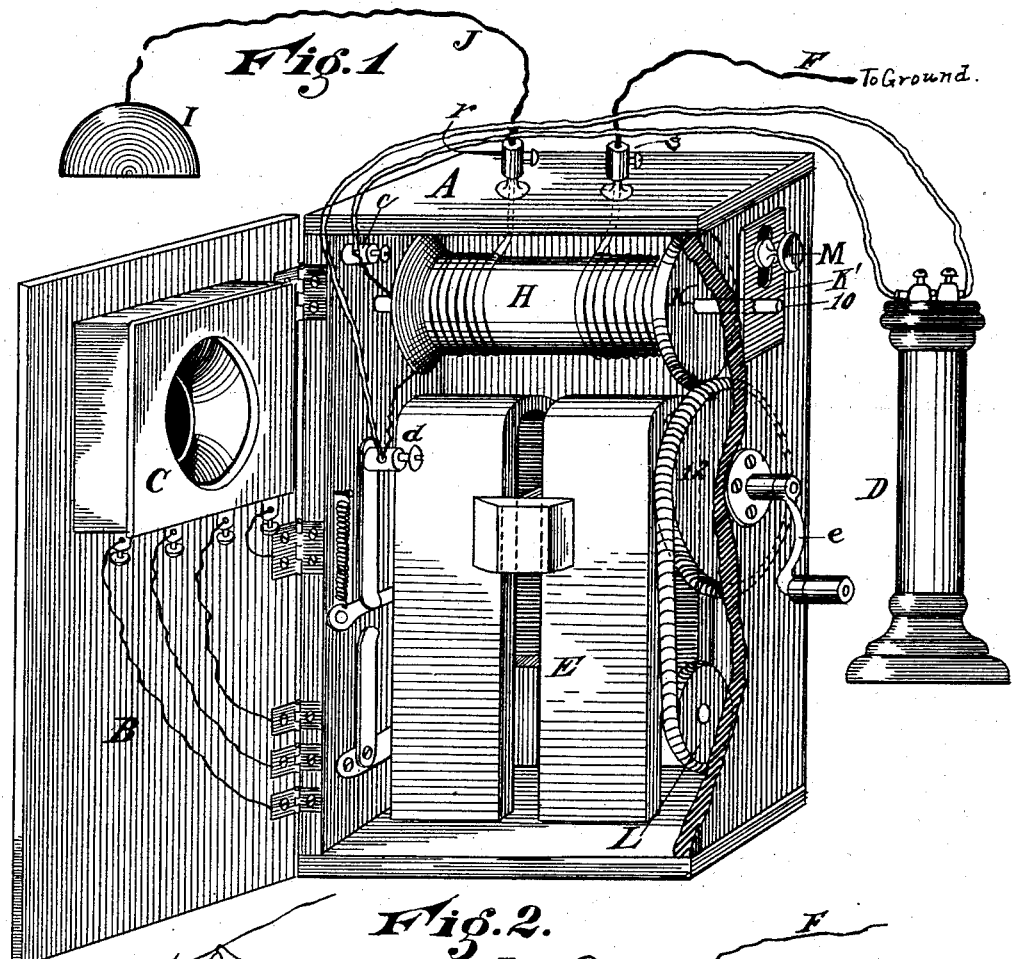
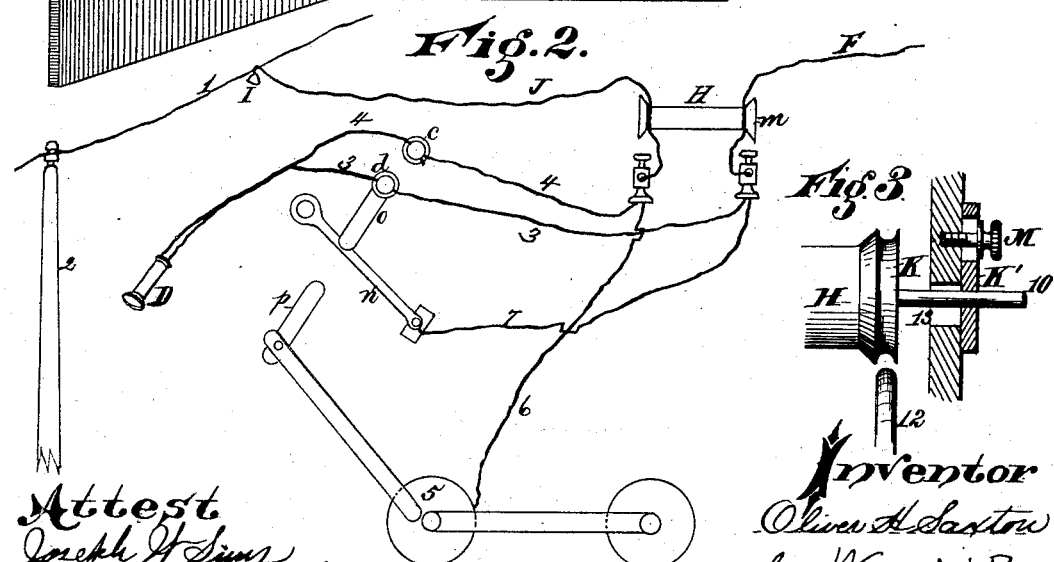
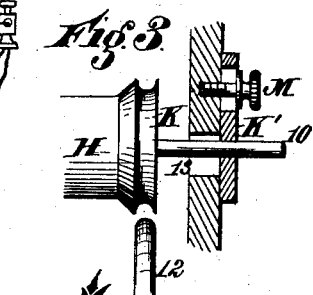
Attest
Joseph H. Sims
John S. Roebuck
Inventor
Oliver H. Saxton
by Woods Boyd
his Attorneys

UNITED STATES PATENT OFFICE.

OLIVER H. SAXTON, OF WASHINGTON, OHIO.

PORTABLE TELEPHONE.

SPECIFICATION forming part of Letters Patent No. 317,213, dated May 5, 1885.

Application filed August 26, 1884. (No model.)

*To all whom it may concern:*

Be it known that I, OLIVER H. SAXTON, a resident of Washington, in the county of Fayette and State of Ohio, have invented certain new and useful Improvements in Portable Telephones, of which the following is a specification.

My invention consists of a portable telephone.

The object of my invention is to provide a telephone-connection combined in a single box or case, so that any person can readily connect it to a main line and call the station, receive, or transmit messages, as desired, all of which will be fully set forth in the description of the accompanying drawings, in which—

Figure 1 is a representation of my invention. Fig. 2 is a diagram showing the connection of the parts. Fig. 3 is a view, partly in section, of certain details of construction.

A represents a box-trunk, in which the telephonic connections are placed.

B represents the hinged door.

C represents the transmitter, secured upon the inside of the door, so as to be protected when the box is closed.

D represents the receiving-instrument, which is connected in circuit by flexible insulating-wire to binding-posts $c\ d$ upon the inside of the box.

E represents a magneto-generator for signaling, which is connected in circuit with the main-line wire.

$e$ represents a crank for operating the generator. I also employ this crank for another purpose, which will be presently described.

In order that the telephone-connections contained in the box A may be readily connected to the main-line wire at the usual elevation above the ground, I have provided the following instrumentality.

H represents a reel, on which wire is wound, which is adapted to be readily connected to the main-line wire for communication with a distant station and connected in circuit with a transmitting-instrument. The reel serves the office of winding up the wire, which is necessary to be extended from the box A to the overhanging main-line wire in order to be connected in circuit.

I represents a weight attached to one end of the wire wound on the reel, so that a person standing on the ground may make a connection with the main line by throwing the weight I over the main line and having the wire J in metallic contact with the main-line wire.

Wire F will be connected to the ground-wire or to any suitable ground-connection.

The operation of using the instrument is as follows: The weight I or wire J is brought into metallic connection with the main-line wire. Wire F is attached to the ground-wire or to the ground itself. A call to the distant station can then be made by the use of the magneto-generator in the ordinary way. When the use of the apparatus is finished at any point and it is desired to remove it thence, the wires F J are disconnected from the line and ground connections. I use the reel H to wind the wires up and into the box A, so that they are protected, secured, and in readiness for use at any desired point. The wires are both attached to the reel, one at each end, so that both may simultaneously be pulled from the case as the reel is turned in one direction, or wound up thereon on turning in the other direction.

K represents a loose disk, mounted on the shaft of reel H.

L represents a friction-belt running over a pulley keyed upon the shaft of crank $e$.

The disk K is arranged so that its edge may be brought firmly in contact with the belt L, so as to be driven thereby, or removed therefrom, so as not to be affected, by the following means: The axis 10 of H passes through a slot, 13, in the side of the case, and has its bearings in a plate, K', which is secured to the exterior of the case by a thumb nut and screw, M, which passes into the wall of the case through a slot in the plate K'. It will be seen that by sliding the plate K' up or down K can be put into frictional gear with the belt 12 or removed therefrom, and held in the desired position by the use of the nut and screw M.

There are several ways in which the inner terminal wires, F J, may be connected in circuit. I prefer the following: $r\ s$ represent hollow binding-posts, through which the wires F and J are drawn when the outer terminal ends are to be connected in the main-line circuit, the parts r s being connected in circuit with the telephone-instruments in the box.

In the diagram, Fig. 2, 1 represents the line-wire; 2, a supporting-pole; J, the portable connecting-wire, and I the weight securing the same over the line-wire.

H represents the reel; F, the ground-wire; D, the receiving-instrument, which has ground-connection through wire 3 and line-connection through wire 4.

5 represents an armature of the generator; n, the spring-switch, which is moved from spring o to spring p, bringing the generator into line-connection through wire 6 and ground-connection through wire 7.

Transmitter C, like the receiving-instrument D, is connected in the main circuit.

I do not desire to limit myself to the exact means of constructing and operating the folding wires F J in the first and second clauses of claims, as other means of folding them within the box A, carrying the telephonic instrument, may be employed and still accomplish all the results of my invention. Neither do I wish to limit myself to the form of generator employed in making a call to a distant station; but the magneto-generator is the best.

A local transmitter-battery is not needed, as the main batteries of the line-wire are in circuit-connection with the telephonic instrument herein described, unless a microphone is employed.

Having described my invention, what I claim is—

1. A portable telephone apparatus consisting of the generator-switch and receiving-instrument suitably inclosed in the box A, with the wires F J projecting from said box and adapted to connect the instrument in box A with the main-line circuit and ground, the wire J being provided with a weight, I, substantially as specified.

2. A portable telephone-instrument consisting, substantially, of the box A, generator B, switch N, and the folding or extension wires F J, adapted to be inclosed in the box A for transportation, and to be readily connected with the wire of a main-line circuit, the line J being provided with a weight, I, substantially as specified.

3. In combination with the generator and receiving-instruments of a telephone, the reel H, mounted within the box A and carrying the wires F J, connected in circuit with the telephone-instrument, and adapted to be unwound and connected to the main-line circuit, substantially as specified.

4. In a portable telephone-instrument, the combination of a transmitter, a receiver, a generator, a reel, H, wires F J, winding thereon, and a sliding plate, K', furnishing a bearing for one end of the shaft of the reel and adapted to bring the disk K into or out of frictional gearing with the motion-communicating parts of the apparatus, substantially as described.

5. In a portable telephone-instrument, the combination of a transmitter, a receiver, a generator, reel H, wires F J, to wind thereon, belt L, passing over pulleys, one of which is secured to the shaft of the driving-crank, a disk, K, on one head of the reel, and a sliding plate, K', supporting the axle 10 of the reel, and adapted to move disk K into or out of operative connection with the belt, substantially as described.

In testimony whereof I have hereunto set my hand.

OLIVER H. SAXTON.

Witnesses:
J. L. McKEE,
C. J. BELL.